United States Patent
Funk et al.

(10) Patent No.: US 9,162,610 B2
(45) Date of Patent: Oct. 20, 2015

(54) METHOD FOR OPERATING A HEADLIGHT OF A MOTOR VEHICLE

(75) Inventors: Christian Funk, Gaimersheim (DE); Alfons Siedersbeck, Offenberg (DE)

(73) Assignee: AUDI AG, Ingolstadt (DE)

( * ) Notice: Subject to any disclaimer, the term of this patent is extended or adjusted under 35 U.S.C. 154(b) by 348 days.

(21) Appl. No.: 13/604,379

(22) Filed: Sep. 5, 2012

(65) Prior Publication Data

US 2013/0057149 A1   Mar. 7, 2013

(30) Foreign Application Priority Data

Sep. 7, 2011   (DE) .......................... 10 2011 112 716

(51) Int. Cl.
*B60Q 1/02* (2006.01)
*B60Q 1/14* (2006.01)
*B60Q 1/04* (2006.01)

(52) U.S. Cl.
CPC ................ *B60Q 1/1415* (2013.01); *B60Q 1/04* (2013.01); *B60Q 2300/112* (2013.01)

(58) Field of Classification Search
USPC .......... 315/77, 82, 83, 317–319, 79; 362/257, 362/459, 460, 464, 465, 466, 475, 543, 544, 362/545
See application file for complete search history.

(56) References Cited

U.S. PATENT DOCUMENTS

| | | | | |
|---|---|---|---|---|
| 7,237,928 | B2 * | 7/2007 | Takeda et al. | 362/276 |
| 7,699,509 | B2 * | 4/2010 | Leleve | 362/464 |
| 8,575,860 | B2 * | 11/2013 | Kikuchi et al. | 315/299 |
| 2008/0094000 | A1 | 4/2008 | Yamamoto et al. | |
| 2008/0123357 | A1 | 5/2008 | Steffel et al. | |
| 2010/0290241 | A1 * | 11/2010 | Tsukamoto | 362/519 |

FOREIGN PATENT DOCUMENTS

| | | |
|---|---|---|
| CN | 2010098706 | 1/2008 |
| CN | 201078614 | 6/2008 |
| DE | 34 36 391 | 1/1986 |
| DE | 199 23 187 | 11/2000 |
| DE | 202004010950 | 11/2004 |
| DE | 102004038065 | 3/2005 |
| DE | 102004014900 | 6/2005 |
| DE | 102004010950 | 9/2005 |
| DE | 10 2006 039 182 | 3/2008 |
| DE | 102009025678 | 1/2010 |
| DE | 102009057391 | 12/2010 |
| EP | 1 512 579 | 3/2005 |
| EP | 1 818 214 | 8/2007 |
| WO | WO2010/046806 | 4/2010 |

* cited by examiner

*Primary Examiner* — Douglas W Owens
*Assistant Examiner* — James H Cho
(74) *Attorney, Agent, or Firm* — Henry M. Feiereisen LLC

(57) ABSTRACT

A headlight of a motor vehicle includes several light emitting devices which are arranged next to each other in at least one direction of the extent of the headlight. When the headlight is switched on, the light emitting devices along at least one direction of the headlight are switched on sequentially.

7 Claims, 1 Drawing Sheet

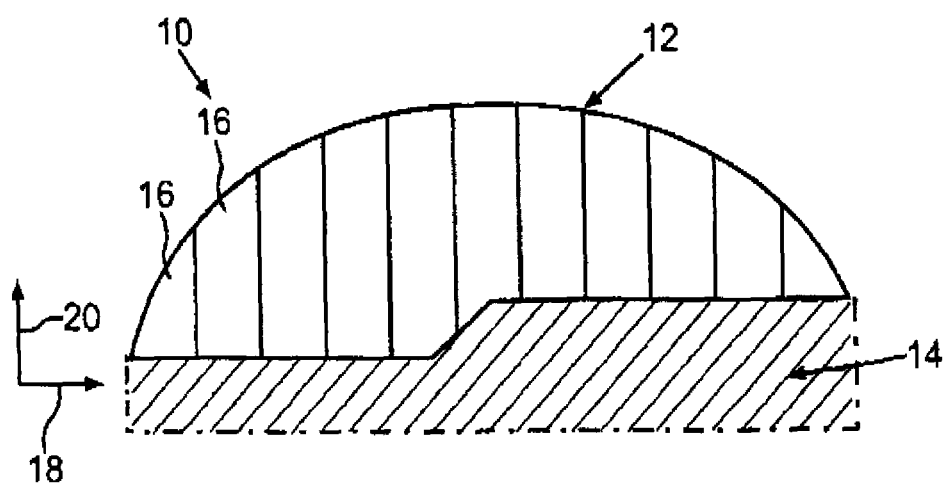

METHOD FOR OPERATING A HEADLIGHT OF A MOTOR VEHICLE

CROSS-REFERENCES TO RELATED APPLICATIONS

This application claims the priority of German Patent Application, Serial No. 10 2011 112 716.3, filed Sep. 7, 2011, pursuant to 35 U.S.C. 119(a)-(d), the content of which is incorporated herein by reference in its entirety as if fully set forth herein.

BACKGROUND OF THE INVENTION

The present invention relates to a method for operating a headlight of a motor vehicle, wherein the headlight has a plurality of light emitting devices. The present invention also relates to a motor vehicle.

The following discussion of related art is provided to assist the reader in understanding the advantages of the invention, and is not to be construed as an admission that this related art is prior art to this invention.

The headlights for the low-beam headlight of motor vehicles have a predetermined light distribution for illuminating the road. In motor vehicles destined for right-hand traffic, the light distribution is curtailed on the left half of the motor vehicle by about 1%. This distribution is a compromise for the different classes of roads. The driver can activate the high-beam headlight in suitable traffic situations to further enhance the visibility at night. According to the Highway Code, the high-beam headlights must be deactivated in residential areas having regular road illumination. The high-beam headlight is hereby abruptly turned off and on without intermediate steps.

Modern motor vehicles increasingly use headlights with light emitting diodes (LEDs). The light emitting diodes are characterized by a long lifetime, high energy efficiency and enhanced design options. The LED headlights can be divided into several segments, with each segment typically including several light emitting diodes. The LED headlights can be used, for example, to provide a low-beam light function and a high-beam light function.

It would therefore be desirable and advantageous to obviate prior art shortcomings and to provide an improved method for operating a headlight of a motor vehicle wherein the headlight includes a plurality of light emitting devices.

SUMMARY OF THE INVENTION

According to one aspect of the present invention, a method for operating a headlight of a motor vehicle, wherein the headlight comprises a plurality of light emitting devices which are arranged next each other in at least one direction of an extent of the headlight, comprises sequentially switching the light emitting devices on along the at least one direction when the headlight is switched on.

Accordingly, when the headlight of the motor vehicle is switched on, a continuous transition of the light distribution in front of the motor vehicle is produced. Therefore, no abrupt changes of the light distribution occur in front of the motor vehicle which could unsettle the driver or other road users. The safety in road traffic can thus be enhanced by continuously switching the individual light emitting devices of the headlight on. In addition, the lighting system of the motor vehicle produces an impression of high-quality due to the soft switching processes.

According to an advantageous feature of the present invention, the headlight may be switched off by sequentially switching off the light emitting devices along the at least one direction of the extent of the headlight. The light distribution in front of the motor vehicle then also does not change abruptly when one of the headlights of the motor vehicle is switched off. This can also improve the safety in road traffic. In addition, a high-quality impression of the lighting system of the motor vehicle is likewise produced.

Such headlight may be used, for example, as a low-beam headlight, a high-beam headlight, a parking light, a daylight running light, a taillight, a brake light and the like. A headlight typically includes a plurality of light emitting devices which are arranged in the headlight in a matrix pattern.

According to another advantageous feature of the present invention, when the headlight is switched on or switched off, the light emitting devices arranged next to each other may be sequentially switched on or switched off along a horizontal extent and/or a vertical extent and/or a diagonal extent of the headlight. A headlight for a motor vehicle typically includes a plurality of light emitting devices which are arranged in the horizontal and/or vertical extent of the headlight. The individual light emitting devices of the headlight can be sequentially activated or deactivated when the headlight is switched on or switched off. This may be done, for example, along the vertical, the horizontal or a diagonal extent of the headlight. For example, when the headlight is switched on, the individual light emitting devices may be switched on along one of the directions of the extent, whereas the individual light emitting devices may be switched off in the opposite direction. This produces an effect similar to a theater curtain which can be opened and closed in a similar manner. This results in a particularly uniform change in the light distribution in front of the motor vehicle.

According to another advantageous feature of the present invention, the brightness of the respective light emitting devices may be increased continuously when they are switched on and decreased continuously when they are switched off. The respective light emitting devices are thus not switched on and switched off abruptly, but instead dimmed. In this way, the light emitting devices can create a particularly soft and harmonious transition of the brightness. This in turn causes the light distribution in front of the motor vehicle to change continuously, thereby producing a particularly high-quality visual impression of the headlight and/or the illumination system of the motor vehicle.

According to another advantageous feature of the present invention, the time interval between the time adjacent light emitting devices are switched on and/or switched off may be changed. The time interval for switching adjacent individual light emitting devices on and off may thus be adapted. According to an advantageous feature of the present invention, adjacent light emitting devices may be switched on and switched off using the same time interval. According to another advantageous feature of the present invention, the time interval for switching the individual light emitting devices along an extent of the headlight on and off may change during the process when the headlight is switched on and off. In this way, the process of switching the headlight of the motor vehicle on and off may be effectively adapted to the environmental conditions, to the driving behavior or commensurate with the desire of the driver.

According to an advantageous feature of the present invention, the time interval during which adjacent light emitting devices are switched on and off may be changed based on speed and/or acceleration of the motor vehicle. For example, the time interval for switching adjacent light emitting devices on or off may be decreased with increasing speed or acceleration of the motor vehicle. Likewise, the time interval may be increased at a lower speed of the motor vehicle. Switching the headlight on and off may thus be precisely adapted to the behavior of the driver.

According to an advantageous feature of the present invention, some individual light emitting devices may not be switched on when the headlight is switched on. Likewise, only selected light emitting devices may be activated. In this way, for example, the light distribution in front of the motor vehicle can be precisely adapted to the road conditions. For example, adaptive curve illumination can be provided in this way. Likewise, the individual light emitting devices of the headlight can be adjusted depending on the road conditions, the weather conditions and the like. A differentiation may also be made between driving in a residential area, on a country road or on a highway.

According to an advantageous feature of the present invention, the headlight may be switched on and off under automatic control depending on data measured by at least one environmental sensor. For example, a suitable environmental sensor may be used to determine whether the motor vehicle is traveling in a residential area or not. For this purpose, for example, a suitable driver assist system or a navigation system may be used. Likewise, the presence of road lighting can be detected with an environmental sensor. For example, the high-beam may be activated automatically when leaving a residential area. The high-beam may also be deactivated when a regular road lighting is detected. The high-beam may also be automatically switched off when oncoming traffic is detected. In addition, corresponding data may advantageously be received from other motor vehicles, based on which the headlights or the light emitting devices of the headlights are switched on or switched off.

According to another aspect of the present invention, a motor vehicle is provided which includes at least one headlight having a plurality of light emitting devices arranged next to one another in at least one direction of an extent of the headlight, and a control device configured to control the light emitting devices individually and to sequentially switch the light emitting devices on or off along the at least one direction.

Other embodiments described above within the context of the method of the invention similarly apply also to the motor vehicle of the invention.

According to an advantageous feature of the present invention, the headlight of the motor vehicle may, for example, be a high-beam headlight. The high-beam headlight may be switched on and switched off by switching the individual light emitting devices of the high-beam headlight sequentially on and off along an extent of the headlight. To allow the high-beam headlight to operate as a headlight flasher, all light emitting devices may, for example, be switched on and switched off simultaneously.

Advantageously, different light distributions, for example a city light, a country road light, a highway light, an intersection light, a turn light and the like may be provided with the headlights of the motor vehicle. For this purpose, the light distribution may be changed by switching the employed light emitting devices of the headlight of the motor vehicle on and off along a direction of the extent of the headlight.

According to an advantageous feature of the present invention, the light emitting devices of the headlight of the motor vehicle may eb light emitting diodes. Typically, light emitting diodes are used which produce white light and which can be used for operating a front headlight of the motor vehicle. Likewise, red light emitting diodes may be used for the rear lights or brake lights. Light emitting diodes are characterized by their long lifetime and energy efficiency.

BRIEF DESCRIPTION OF THE DRAWING

Other features and advantages of the present invention will be more readily apparent upon reading the following description of currently preferred exemplified embodiments of the invention with reference to the accompanying drawing, in which the sole:

FIG. 1 shows a schematic diagram of a headlight for a motor vehicle according to the present invention.

DETAILED DESCRIPTION OF PREFERRED EMBODIMENTS

These embodiment depicted in the FIGURE is to be understood as illustrative of the invention and not as limiting in any way. It should also be understood that the FIGURE is not necessarily to scale and that the embodiment is sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, FIG. 1 shows in a schematic diagram a top view of a headlight 10 for a motor vehicle. The headlight 10 includes a high-beam headlight 12 and a low-beam headlight. Only the high-beam headlight 12 is illustrated in the FIGURE. The position of the low-beam headlights is indicated by the hatched area 14. Only the high-beam headlight 12 will here be described. However, the same concept applies to the low-beam headlights, or to another light of the motor vehicle, such as the daylight running light, a brake light, a backup light, a turn signal and the like.

The headlight 10 is subdivided into several segments 13. In the present example, the headlight 10 includes ten segments 16. The exemplary segments 16 are here arranged along a first extent 18 of the headlight 10. The first direction 18 corresponds to a horizontal direction 18 of the headlight 10. However, any other direction of the headlight can be considered. Each of the segments 16 includes one or several (unillustrated) light emitting devices. The light emitting devices are preferably light emitting diodes, in particular white light emitting diodes. The majority of light emitting devices is typically arranged in the headlight 10 in form of a matrix or array. The matrix has a first direction 18 and a second, orthogonal direction 20. The individual light emitting devices can be arranged either along the first direction 18 or along the second direction 20. Preferably, at least two of the light emitting devices are arranged next to each other in the first direction 18 and in the second direction 20, thereby producing a two-dimensional arrangement of the light emitting devices in the headlight 10.

When the headlight 10 is switched on, the individual light emitting devices are sequentially switched on along the at least one direction 18, 20 of the headlight 10. This may take place, for example, along the first direction 18. The individual light emitting devices may be sequentially switched on along the first direction 18; likewise, the individual light emitting devices in a segment may also be switched on simultaneously and the individual segments may be switched on sequentially along the direction 18. Likewise, the individual light emitting devices may be switched on along the direction 20. In addition, the individual light emitting devices may be switched on along a direction which is diagonal with respect to the directions 18 and 20.

When the headlight is switched off, the individual light emitting devices are switched off sequentially along one direction 18, 20 of the headlight 10. For example, the individual light emitting devices in the diagram may be switched on from the left to the right and may be switched off again from the right to the left. Any other direction along the different directions of extent of the headlight 10 is feasible.

The light emitting devices are preferably switched on and switched off not abruptly, but rather continuously or dimmed. The light distribution in front of the motor vehicle then also does not change abruptly. The driver or other road users are then not unsettled or disturbed. In addition, the afore-described control of the individual light emitting devices of the headlight 10 produces a particularly high quality and pleasant visual impression of the lighting system of the motor vehicle.

The headlight 10 may also be switched on and switched off under automatic control, depending on measured data from at least one environmental sensor of the motor vehicle. For example, a corresponding road illumination can be measured. Likewise, the road conditions or the weather conditions may be determined. It can also be determined whether the motor vehicle is located in a residential area, on a country road or on a highway.

Likewise, the time interval between switching adjacent light emitting devices of the headlight 10 on and off may be changed. The individual light emitting devices may be switched on and off in identical time intervals; likewise, the time intervals may also be varied. In addition, the time interval between switching adjacent light emitting devices on and off may be changed depending on a speed and/or an acceleration of the motor vehicle. In this way, the light distribution produced by the headlight 10 in front of the motor vehicle can be very effectively adapted to the driving behavior of the driver, the environmental conditions and external effects.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for operating a headlight of a motor vehicle, wherein the headlight comprises a plurality of light emitting devices which are arranged next each other in at least one direction of an extent of the headlight, the method comprising:
   sequentially switching the light emitting devices on along the at least one direction when the headlight is switched on, and
   based on at least one of speed and an acceleration of the motor vehicle, changing a time interval between a time when adjacent light emitting devices are switched on and when adjacent light emitting devices are switched off.

2. The method of claim 1, further comprising sequentially switching the light emitting devices off along the at least one direction when the headlight is switched off.

3. The method of claim 1, wherein the light emitting devices arranged next to each other are sequentially switched on or off along at least one of a horizontal direction, a vertical direction and a diagonal direction of the extent of the headlight.

4. The method of claim 1, characterized in that a brightness of the plurality of light emitting devices is continuously increased when the light emitting devices are switched on, and is continuously decreased when the light emitting devices are switched off.

5. The method of claim 1, wherein switching the headlight on and off is controlled automatically, based on data measured by at least one environmental sensor.

6. A motor vehicle comprising:
   at least one headlight having a plurality of light emitting devices arranged next to one another in at least one direction of an extent of the headlight, and
   a control device configured to control the light emitting devices individually and to sequentially switch the light emitting devices on or off along the at least one direction, wherein a time interval between a time when adjacent light emitting devices are switched on and when adjacent light emitting devices are switched off is changed based on at least one of speed and an acceleration of the motor vehicle.

7. The motor vehicle of claim 6, wherein the light emitting devices of the headlight comprise light emitting diodes.

* * * * *